United States Patent
Senapati et al.

(10) Patent No.: US 9,978,047 B2
(45) Date of Patent: May 22, 2018

(54) INTEGRATING PAYMENT AGGREGATORS WITH E-COMMERCE PLATFORM

(71) Applicant: Tata Consultancy Services Limited, Mumbai, Maharashtra (IN)

(72) Inventors: Tapas Ranjan Senapati, Odisha (IN); Rakesh Sahoo, Odisha (IN); Sumit Purohit, Odisha (IN); Rashmi Ranjan Hati, Odisha (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days. days.

(21) Appl. No.: 13/771,751

(22) Filed: Feb. 20, 2013

(65) Prior Publication Data
US 2013/0218738 A1 Aug. 22, 2013

(30) Foreign Application Priority Data
Feb. 21, 2012 (IN) .................... 476/2012

(51) Int. Cl.
*G06Q 20/12* (2012.01)
*G06Q 20/22* (2012.01)
*G06Q 30/06* (2012.01)

(52) U.S. Cl.
CPC .......... *G06Q 20/12* (2013.01); *G06Q 20/227* (2013.01); *G06Q 30/0601* (2013.01)

(58) Field of Classification Search
CPC ........ G06Q 40/00; G06Q 40/02; G06Q 20/40; G06K 13/06; G06K 5/00; G06F 17/60; G06F 17/00; G06F 17/30
See application file for complete search history.

(56) References Cited

U.S. PATENT DOCUMENTS

| | | | |
|---|---|---|---|
| 6,363,362 B1 | 3/2002 | Burfield et al. | |
| 2003/0014327 A1 | 1/2003 | Skantze | |
| 2008/0103923 A1 | 5/2008 | Rieck et al. | |
| 2009/0313147 A1 | 12/2009 | Balasubramanian et al. | |
| 2010/0280909 A1 | 11/2010 | Zhang et al. | |
| 2012/0072347 A1* | 3/2012 | Conway | G06Q 20/04 705/44 |
| 2012/0311433 A1* | 12/2012 | Pasupulati | G06Q 20/02 715/234 |

(Continued)

OTHER PUBLICATIONS

Lamb, E. C. (2000). Electronic billing: The missing link. Community Banker, 9(11), 16-20. Retrieved from https://search.proquest.com/docview/195162125?accountid=14753.*

(Continued)

*Primary Examiner* — Muriel S Tinkler
(74) *Attorney, Agent, or Firm* — Banner & Witcoff, Ltd.

(57) ABSTRACT

Systems and methods for integrating an e-commerce platform with at least one payment aggregator are provided. The system comprising a processor and a memory coupled to the processor. The memory comprises an integrating module configured to provide a Generic Interface Framework (GIF). The GIF comprises a plurality of configuration files having activity details of a plurality of payment aggregators. The integrating module is further configured to integrate at least one payment aggregator selected from amongst the plurality of payment aggregators with the e-commerce platform based upon the plurality of configuration files.

11 Claims, 2 Drawing Sheets

(56) References Cited

U.S. PATENT DOCUMENTS

2012/0323938 A1* 12/2012 Skeen ............... G06F 17/30752
707/754

OTHER PUBLICATIONS

Van Bossuyt, M., & Van Hove, L. (2007). Mobile payment models and their implications for NextGen MSPs. Info : The Journal of Policy, Regulation and Strategy for Telecommunications, Information and Media, 9(5), 31-43. Retrieved from https://search.proquest.com/docview/1957149378?accountid=14753.*

* cited by examiner

US 9,978,047 B2

INTEGRATING PAYMENT AGGREGATORS WITH E-COMMERCE PLATFORM

TECHNICAL FIELD

The present subject matter described herein, in general, relates to integration of e-commerce platform with payment aggregators.

BACKGROUND

With the advent of technology, electronic-commerce or shopping on the web has become quite popular. Due to this, a lot of merchants have set up e-commerce platforms, such as eBay® and Amazon®, to sell products and services online. Each of these merchants uses payment aggregators for receiving payment from online shoppers. For example, a watch merchant may display watches on an e-commerce platform belonging to the watch merchant. The displayed watches may be bought by online shoppers. The payment of the watches sold online may be received by a payment aggregator, such as E-billing solutions (EBS®), BillDesk®, and PayPal®, which is integrated with the e-commerce platform. The payment aggregator may subsequently remit the payment received from the online shoppers to a bank account of the watch merchant. As known, a single payment aggregator may be used by several e-commerce platforms for routing payments to their respective bank accounts.

SUMMARY

This summary is provided to introduce concepts related to integrating an e-commerce platform with at least one payment aggregator and the concepts are further described below in the detailed description. This summary is not intended to identify essential features of the claimed subject matter nor is it intended for use in determining or limiting the scope of the claimed subject matter.

In one implementation, a system for integrating an e-commerce platform with at least one payment aggregator is provided. The system comprising a processor and a memory coupled to the processor. The memory comprises an integrating module configured to provide a Generic Interface Framework (GIF). The GIF comprises a plurality of configuration files having activity details of a plurality of payment aggregators. The integrating module is further configured to integrate at least one payment aggregator selected from amongst the plurality of payment aggregators with the e-commerce platform based upon the plurality of configuration files.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
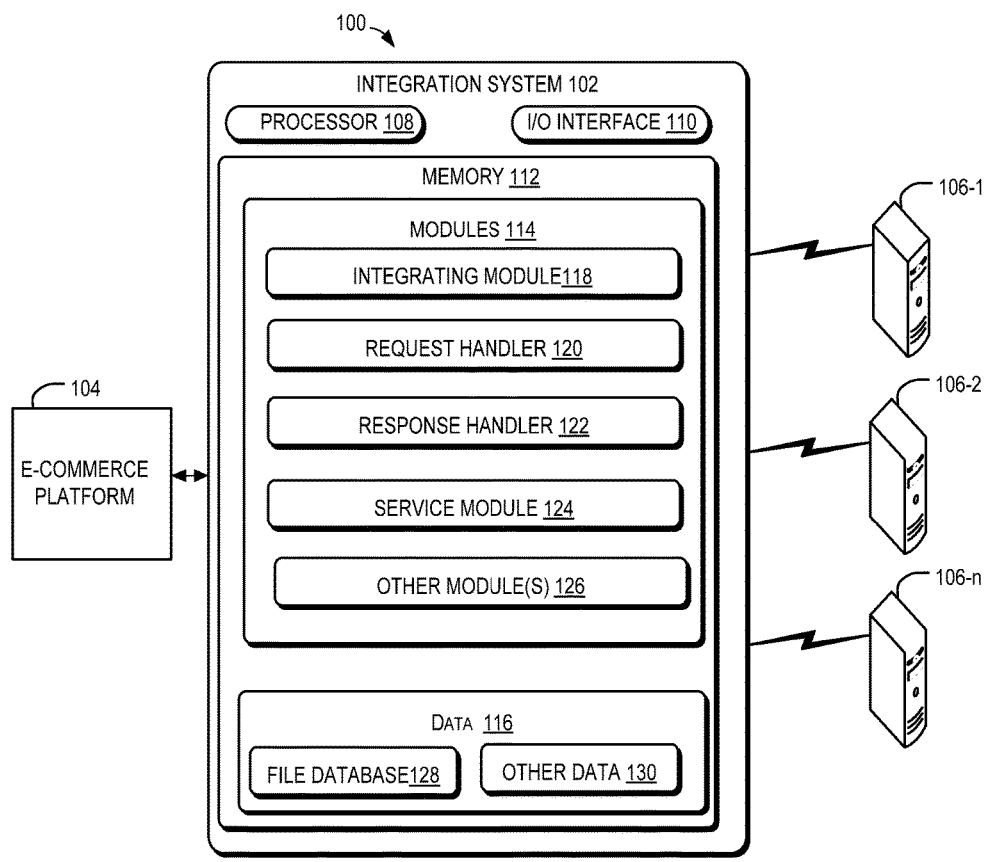
FIG. 1 illustrates an implementation of an integration system for facilitating integration of an e-commerce platform with one or more payment aggregators, in accordance with an embodiment of the present subject matter.

System and method for facilitating integration of one or more payment aggregators with an e-commerce platform are described herein. As known, a merchant may use an e-commerce platform to sell products or services online. In order to receive payments for the product or services, the e-commerce platform may be integrated with a payment aggregator, such as BillDesk®, PayPal®, EBS®, and the like. In one implementation, if a merchant X wishes to switch from one payment aggregator to another, then the e-commerce platform of the merchant X may be changed completely by an Information Technology (IT) service provider as functionality or a working methodology of different payment aggregators is different. A similar problem of changing the e-commerce platform completely may arise if the merchant X decides to use more than one payment aggregators for receiving payments from online shoppers.

Further, a problem of designing different e-commerce platforms for different merchants may be faced by the IT service provider as different merchants demand integration of their e-commerce platforms with different payment aggregators. For example, a merchant M1 may engage an IT service provider SP1 to implement an e-commerce platform E1 for selling watches online. The merchant M1 may request the IT service provider SP1 to integrate the e-commerce platform E1 with a payment aggregator PAL Similarly, a merchant M2 may also engage the IT service provider SP1 to implement an e-commerce platform E2 and may request the IT service provide SP1 to integrate the e-commerce platform E2 with a payment aggregator PA2. Therefore, for every new merchant, the IT service provider SP1 may need to develop completely new techniques to integrate their e-commerce platforms with various payment aggregators as different payment aggregators work differently.

In order to avoid changing the e-commerce platform of the merchant X when the merchant X either wishes to switch from one payment aggregator to another or when the merchant X wishes to use multiple payment aggregators, the IT service provider may provide a Generic Interface Framework (GIF). The GIF is provided so that the e-commerce platform may be integrated with the one or more payment aggregators with minimum configuration changes, thereby avoiding the need to completely modify the e-commerce platform. Further, the GIF is also used by the IT service provider SP1 so that the IT service provider SP1 does not need to develop completely new techniques for every new merchant wishing to integrate an e-commerce platform with a new payment aggregator.

In one implementation, the GIF may comprise a plurality of configuration files associated with the plurality of payment aggregators. In one implementation, each payment aggregator may have a corresponding configuration file. The plurality of configuration files may have activity details of each of the plurality of payment aggregators. The activity details may include the activities performed by each payment aggregator along with a manner used by each of the payment aggregators to perform the activities. In one example, the activities may include payer authorization, card details acceptance, payment acceptance, payment cancellation, and the like. The activities performed by various payment aggregators are nearly same; however, the manner of performing such activities may vary considerably. As the activity details of each of the plurality of payment aggregators are collated in the configuration files, integrating one or more payment aggregators with the e-commerce platform may be done with minimum configuration changes. In other words, when a payment aggregator is selected to be integrated with the e-commerce platform, a configuration file corresponding to the selected payment aggregator is configured as per the functionality of the selected payment aggregator, thereby integrating the selected payment aggregator with the e-commerce platform with minimum configuration changes. In one implementation, the corresponding configuration file is modified to connect the e-commerce platform with the selected payment aggregator.

While aspects of described system and method for facilitating integration of one or more payment aggregators with an e-commerce platform may be implemented in any number of different computing systems, environments, and/or configurations, the embodiments are described in the context of the following exemplary system.

Referring now to FIG. 1, an implementation 100 of an integration system 102 for facilitating integration of an e-commerce platform 104 with one or more payment aggregators 106-1 to 106-n is illustrated, in accordance with an embodiment of the present subject matter. In one implementation, the integration system 102 may be implemented in a variety of computing systems, such as a laptop computer, a desktop computer, a notebook, a workstation, a mainframe computer, a server, a network server, and the like. In the present implementation, the integration system 102 is shown to be a separate entity, however, in another implementation; the integration system 102 may be incorporated as a part of the e-commerce platform 104. In such an implementation, the e-commerce platform 104 may be understood as a computing device, such as a server or a desktop computer incorporating the integration system 102. The integration system 102, the e-commerce platform 104, and the plurality of payment aggregators 106-1 to 106n (hereinafter collectively referred as the payment aggregators 106) may be communicatively coupled with one another through a network (not shown).

In one implementation, the network may be a wireless network, a wired network or a combination thereof. The network can be implemented as one of the different types of networks, such as intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

In one embodiment, the integration system 102 may include at least one processor 108, an I/O interface 110, and a memory 112. The at least one processor 108 may be implemented as one or more microprocessors, microcomputers, microcontrollers, digital signal processors, central processing units, state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the integration system 102 to interact with a user directly or through one or more client devices (not shown) 104. Further, the I/O interface 110 may enable the integration system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 112 may include modules 114 and data 116.

The modules 114 include routines, programs, objects, components, data structures, etc., which perform particular tasks or implement particular abstract data types. In one implementation, the modules 114 may include an integrating module 118, a request handler 120, a response handler 122, a service module 124, and other modules 126. The other modules 126 may include programs or coded instructions that supplement applications and functions of the integration system 102.

The data 116, amongst other things, serves as a repository for storing data processed, received, and generated by one or more of the modules 114. The data 116 may also include file database 128 and other data 130. The other data 130 may include data generated as a result of the execution of one or more modules in the other modules 126.

In one embodiment, the integration system 102 helps in integrating the e-commerce platform 104 with one or more of the plurality of payment aggregators 106. As known, the e-commerce platform 104 may be used by a variety of merchants for selling products and services online. For example, eBay®, Amazon®, Snapdeal®, Flipkart®, HomeShop18®, Myntra®, are some of the e-commerce platforms 104 used for selling products and services online. In order to receive payment from online shoppers who buy these products and services, the e-commerce platform 104 is integrated with the payment aggregators 106, such as BillDesk®, PayPal®, and EBS®. The payment aggregators 106 are used by a variety of merchants for routing payments from their e-commerce platforms 104 to their respective bank accounts.

In one example, a merchant M1 involved in a business of selling watches on an e-commerce platform E1 may use a payment aggregator PA1 for accepting payment from online shoppers buying watches from the e-commerce platform E1. Similarly, a merchant M2 involved in a business of selling books on an e-commerce platform E2 may also use the payment aggregator PA1 for accepting payment from online shoppers buying books from the e-commerce platform E2. Therefore, it may be understood that a single payment aggregator may be used by a plurality of merchants for rerouting payments to their respective bank accounts.

In the present example, the merchant M1 may wish to switch from the payment aggregator PA1 to the payment aggregator PA2 or may wish to use both the payment aggregators PA1 and PA2 to accept payment from online shoppers. In order to save time and resources invested by an IT service provider to make changes as per the wishes of the merchant M1, the integration system 102 is provided for smooth transition of the e-commerce from one payment aggregator to another. Further, the integration system 102 may be used for integration of one or more payment aggregators with an e-commerce platform.

In one implementation, the integrating module 118 of the integration system 102 may provide a Generic Interface Framework (GIF) for integrating the one or more payment aggregators 106 with the e-commerce platform 104. The GIF comprises a plurality of configuration files of the payment aggregators 106. In one implementation, each payment aggregator may have a corresponding configuration file. The configuration files may include activity details of the payment aggregators 106. The activity details may include a list of activities performed by each of the payment aggregators 106. Along with the list of activities, working methodology or a manner in which a particular activity is performed by a particular payment aggregator is also included in the activity details. As known, the working methodologies of different payment aggregators 106 may differ substantially. In one example, the activities may include payer authorization, card details acceptance, payment acceptance, payment cancellation, and the like. Although the activities performed by different payment aggregators 106 are substantially similar, it may be understood that there may be slight variations in the activities being performed by the different payment aggregators 106. In one example, the payment aggregators 106 primarily carry out the activities, such as authorization, capturing, and refunding. A process of authorization may comprise accepting debt/credit card details from the user, locking an amount to be paid, and validating the user and the debt/credit card details. A process of capturing may comprise charging the amount to the debit/credit card. Further, a process of refund may comprise accepting cancellation and crediting the amount to the user's account. It may be understood that the manner in which the activities, such as authorization, capturing, and refunding are carried out, may differ for each of the payment aggregators 106.

In one example, a payment aggregator PA1 may perform activities 1-8, a payment aggregator PA2 may perform activities 2-8, and a payment aggregator PA3 may perform activities 2-10. In the present implementation, the activity details present in the configuration files may include all activities ranging from 1-10 along with the working methodology, i.e., a manner of performing each activity by each of the payment aggregators 106. Therefore, it may be understood that the GIF provides a framework, in the form of configuration files, for easy and smooth integration of the e-commerce platform 104 with one or more of payment aggregators 106. In one implementation, the configuration files are based on Extensible Markup Language (XML) and may be stored in the file database 128. However, in another implementation, the configuration files may be based upon some other source or language.

In one implementation, based upon a merchant's selection, a payment aggregator from the plurality of payment aggregators 106 may be selected and integrated with the e-commerce platform 104 with minimum changes in the configuration files. In the present implementation, when a merchant wishes to integrate the e-commerce platform 104 with a selected payment aggregator from the plurality of payment aggregators 106, a configuration file corresponding to the selected payment aggregator is modified by the integrating module 118 based upon the activity details of the selected payment aggregator. As the activity details, i.e., the list of activities and the working methodology of the selected payment aggregator are already stored in the configuration files, the selected payment aggregator may be seamlessly integrated with the e-commerce platform 104 with minimum changes in the configuration files. For example, when the merchant M1 wishes to switch from payment aggregator PA1 to payment aggregator PA2, then a configuration file containing activity details of the payment aggregator PA2 may be modified a little for seamless integration of the e-commerce platform 104 with the payment aggregator PA2. In the present example, the configuration files may be modified to retain only the activity details corresponding to the payment aggregator PA2.

In another example, if the merchant M1 wishes to use two payment aggregators, i.e., the payment aggregator PA1 and the payment aggregator PA2 for accepting payment for products and services sold on e-commerce platform 104, then the configuration files containing activity details of both the payment aggregator PA1 and the payment aggregator PA2 may be modified accordingly for integrating the e-commerce platform 104 with the payment aggregators PA1 and PA2.

In the present implementation, after the selected payment aggregator(s) is integrated with the e-commerce platform 104, the request handler 120 may collect a set of requests from the e-commerce platform 104 and redirect the set of requests to the selected payment aggregator. The set of requests is associated with activity details of the selected payment aggregator. In other words, the set of requests capture the activities that may be performed by the selected payment aggregator. For example, an online shopper wishing to buy books from an e-commerce platform E2 may initiate a transaction by providing user details, such as name, card details, billing address, card expiry date, and the like. After the online shopper provides the user details on the e-commerce platform 104, certain auxiliary information, such as order ID may be generated. The user details together with the auxiliary information may comprise the set of requests. The set of requests may be sent to the selected payment aggregator by the request handler 120. In one implementation, the request handler 120 may collate all kind of requests, i.e., the set of requests from the e-commerce platform 104 and redirect the same to a corresponding method, illustrated in the configuration file of the selected payment aggregator. Subsequently, based upon the set of requests, the selected payment aggregator may process the transaction initiated by the online shopper.

Further, while the transaction is in process, the response handler 122 may receive aggregator information from the selected payment aggregator and redirect the aggregator information to the e-commerce platform 104. The aggregator information may be understood as data being generated by the selected payment aggregator on completion of the transaction initiated by an online shopper. Examples of aggregator information may include a line item, a total amount, a response URL for displaying an output, such as payment ID or last four digits of the card used for making the transaction, a transaction status, i.e., whether successful or not, and the like. In one implementation, the response handler 122 may convert the aggregator information into a format that the e-commerce platform 104 is capable of understanding. Subsequently, the response handler 122 may take necessary actions on the aggregator information. Examples of necessary action by the response handler 122 may include updating a payment status, a payment log, and an order status.

In one implementation, both the request handler 120 and the response handler 122 may use the service module 124 for parsing the XML based configuration files. The service module 124 may parse the configuration files, thereby facilitating communication between the e-commerce platform 104 and the selected payment aggregator. As the set of requests and the aggregator information pass through the configuration files, parsing of the configuration files may be performed for facilitating communication between the e-commerce platform 104 and the selected payment aggregator. In one example, the service module 124 may use an Application Programming Interface (API) to connect with the selected payment aggregator using the corresponding method mentioned in the configuration files.

Therefore, it may be understood that the integration system 102 may be referred to as one stop shop for integrating any payment aggregator with an e-commerce platform 104 because the integration system 102 comprises configuration files which stores activity details of all the payment aggregators 106, thereby facilitating seamless integration with minimum changes in the configuration files.

Figure 2:
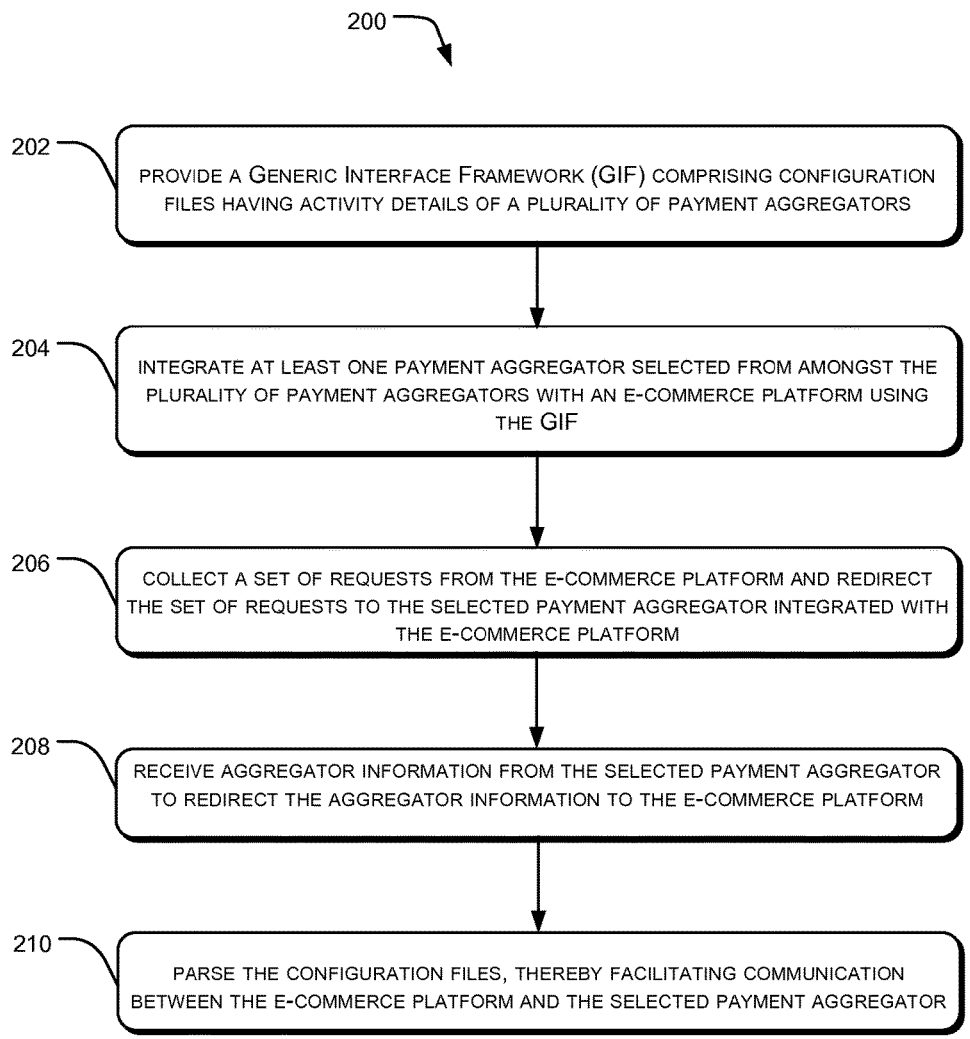
FIG. 2 shows a flowchart illustrating a method for integrating an e-commerce platform with at least one payment aggregator, in accordance with an embodiment of the present subject matter.

Referring now to FIG. 2, a method 200 for integrating an e-commerce platform 104 with at least one payment aggregator is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communications network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternate methods. Additionally, individual blocks may be deleted from the method 200 without departing from the spirit and scope of the subject matter described herein. Furthermore, the method can be implemented in any suitable hardware, software, firmware, or combination thereof. However, for ease of explanation, in the embodiments described below, the method 200 may be considered to be implemented in the above described integration system 102.

At block 202, a Generic Interface Framework (GIF) is provided. The GIF may comprise a plurality of configuration files having activity details of a plurality of payment aggregators 106. In one example, the GIF is provided by the integrating module 118.

At block 204, at least one payment aggregator selected from amongst the plurality of payment aggregators 106 is integrated with the e-commerce platform 104 using the GIF. In one example, the at least one payment aggregator is integrated with the e-commerce platform 104 by the integrating module 118.

At block 206, a set of requests is collected from the e-commerce platform 104 and subsequently the set of requests is redirected to the selected payment aggregator integrated with the e-commerce platform 104. The set of requests is associated with activity details of the selected payment aggregator. In one example, the set of requests are collected and redirected by the request handler 120.

At block 208, aggregator information is received from the selected payment aggregator and redirected to the e-commerce platform 104. In one example, the aggregator information is received and redirected by the response handler 122.

At block 210, the configuration files are parsed, thereby facilitating communication between the e-commerce platform 104 and the selected payment aggregator. In one example, the configuration files are parsed by the service module 124.

Although implementations for methods and systems for integrating an e-commerce platform 104 with at least one payment aggregator have been described in language specific to structural features and/or methods, it is to be understood that the appended claims are not necessarily limited to the specific features or methods described. Rather, the specific features and methods are disclosed as examples of implementations for integrating an e-commerce platform 104 with at least one payment aggregator.

We claim:

1. An integration system for integrating an e-commerce platform with a payment aggregator, the integration system comprising:

a processor; and a memory coupled to the processor, wherein the memory comprises an integrating module configured to:

generate a plurality of configuration files corresponding to a plurality of payment aggregators using a generic interface framework (GIF) provided by the integration module, wherein each of the plurality of configuration files includes activity details of each of the corresponding plurality of payment aggregators collated from each of the corresponding plurality of payment aggregators, wherein the activity details comprise a plurality of activities performed by each payment aggregator, and wherein the activity details comprises a manner of performing the plurality of activities;

receive a selection of a payment aggregator by a merchant from amongst the plurality of payment aggregators when the merchant requests to switch from a current payment aggregator to the selected payment aggregator;

modify a configuration file corresponding to the selected payment aggregator for seamless integration of the e-commerce platform with the payment aggregator without modifying the e-commerce platform; and integrate the selected payment aggregator with the e-commerce platform based upon the modification of the corresponding configuration file of the selected payment aggregator, wherein the selected payment aggregator is integrated by configuring the corresponding configuration file according to a functionality of the selected payment aggregator, wherein the configuration file corresponding to the selected payment aggregator is parsed, by a service module in the integration system, to establish a communication between the e-commerce platform and the selected payment aggregator, and wherein the memory further comprises a response handler in the integration system configured to:

receive aggregator information from the selected payment aggregator while a transaction is in progress, redirect the aggregator information to the e-commerce platform, convert the aggregator information into a format supportable by the e-commerce platform and subsequently update payment status, a payment log, and an order status in the aggregator information, wherein the aggregator information corresponds to data generated by the selected payment aggregator on completion of the transaction, wherein the response handler uses an I/O interface in the integration system to enable the integration system to communicate with the e-commerce platform.

2. The integration system of claim 1, wherein the GIF is incorporated in the e-commerce platform.

3. The integration system of claim 1, wherein the plurality of configuration files is based on Extensible Markup Language (XML).

4. The integration system of claim 1, wherein the activity details comprises a list of activities performed by the plurality of payment aggregators and a working methodology of each activity in the list of activities by each payment aggregator of the plurality of payment aggregators.

5. The integration system of claim 1, wherein the memory further comprises a request handler configured to collect a set of requests from the e-commerce platform and redirect the set of requests to the selected payment aggregator integrated with the e-commerce platform, wherein the set of requests is associated with the activity details of the selected payment aggregator.

6. A computer implemented method for integrating an e-commerce platform with a payment aggregator, the computer implemented method being implemented by a processor on an integration system, the computer implemented method comprising:

generating, by the processor, a plurality of configuration files corresponding to a plurality of payment aggregators using a generic interface framework (GIF) provided by an integration module in the integration system, wherein each of the plurality of configuration files includes activity details of each of the corresponding plurality of payment aggregators collated from each of the corresponding plurality of payment aggregators, wherein the activity details comprise a plurality of activities performed by each payment aggregator, and wherein the activity details comprises a manner of performing the plurality of activities;

receiving a selection of a payment aggregator by a merchant from amongst the plurality of payment aggregators when the merchant requests to switch from a current payment aggregator to the selected payment aggregator;

modifying, by the processor, a configuration file corresponding to the selected payment aggregator for seamless integration of the e-commerce platform with the payment aggregator without modifying the e-commerce platform;

integrating, by the processor, the selected payment aggregator with the e-commerce platform based upon the modification of the corresponding configuration file of the selected payment aggregator, wherein the selected payment aggregator is integrated by configuring the corresponding configuration file according to functionality of the selected payment aggregator, wherein the configuration file corresponding to the selected payment aggregator is parsed, by a service module in the integration system, to establish a communication between the e-commerce platform and the selected payment aggregator; and receiving, by a response handler in the integration system, aggregator information from the selected payment aggregator while a transaction is in progress, redirecting the aggregator information to the e-commerce platform, converting the aggregator information into a format supportable by the e-commerce platform and subsequently updating payment status, a payment log, and an order status in the aggregator information, wherein the aggregator information corresponds to data generated by the selected payment aggregator on completion of the transaction, wherein the response handler uses an I/O interface in the integration system to enable the integration system to communication with the e-commerce platform.

7. The computer implemented method of claim 6, wherein the GIF is incorporated in the e-commerce platform.

8. The computer implemented method of claim 6, wherein the plurality of configuration files is based on Extensible Markup Language (XML).

9. The computer implemented method of claim 6, wherein the activity details comprises a list of activities performed by the plurality of payment aggregators and a working methodology of each activity in the list of activities by each payment aggregator of the plurality of payment aggregators.

10. The computer implemented method of claim 6, further comprising:

collecting, by the processor, a set of requests from the e-commerce platform; and redirecting, by the processor, the set of requests to the selected payment aggregator integrated with the e-commerce platform, wherein the set of requests is associated with activity details of the selected payment aggregator.

11. A non-transitory computer-readable medium having embodied thereon computer-executable instructions that when executed by one or more processors, configures the one or more processors for executing a method for integrating an e-commerce platform with a payment aggregator, the method comprising:

generating a plurality of configuration files corresponding to a plurality of payment aggregators using a generic interface framework (GIF) provided by an integration module in an integration system, wherein each of the plurality of configuration files includes activity details of each of the payment aggregators collated from each of the corresponding plurality of payment aggregators, wherein the activity details comprise a plurality of activities performed by each payment aggregator, and wherein the activity details comprises a manner of performing the plurality of activities;

receiving a selection of the payment aggregator by a merchant from amongst the plurality of payment aggregators when the merchant requests to switch from a current payment aggregator to the selected payment aggregator;

modifying the configuration file corresponding to the selected payment aggregator for seamless integration of the e-commerce platform with the payment aggregator without modifying the e-commerce platform;

integrating the selected payment aggregator with the e-commerce platform based upon the modification of the corresponding configuration file of the selected payment aggregator, wherein the selected payment aggregator is integrated by configuring the corresponding configuration file according to functionality of the selected payment aggregator, wherein the configuration file corresponding to the selected payment aggregator is parsed, by a selection module in the integration system, to establish a communication between the e-commerce platform and the selected payment aggregator; and receiving, by a response handler in the integration system, aggregator information from the selected payment aggregator while a transaction is in progress, redirecting the aggregator information to the e-commerce platform, converting the aggregator information into a format supportable by the e-commerce platform and subsequently updating payment status, a payment log, and an order status in the aggregator information, wherein the aggregator information corresponds to data generated by the selected payment aggregator on completion of the transaction, wherein the response handler uses an I/O interface in the integration system to enable the integration system to communication with the e-commerce platform.

* * * * *